(12) United States Patent
Wilson

(10) Patent No.: US 7,605,804 B2
(45) Date of Patent: Oct. 20, 2009

(54) SYSTEM AND METHOD FOR FINE CURSOR POSITIONING USING A LOW RESOLUTION IMAGING TOUCH SCREEN

(75) Inventor: Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 11/119,504

(22) Filed: Apr. 29, 2005

(65) Prior Publication Data

US 2006/0244735 A1    Nov. 2, 2006

(51) Int. Cl.
*G06F 3/041*  (2006.01)
*G06F 3/048*  (2006.01)

(52) U.S. Cl. .................. 345/173; 715/656; 715/858

(58) Field of Classification Search ............ 345/173, 345/178, 174, 175, 177; 715/856–864
See application file for complete search history.

(56) References Cited

U.S. PATENT DOCUMENTS

| | | | |
|---|---|---|---|
| 5,825,352 A * | 10/1998 | Bisset et al. ............... 345/173 |
| 6,178,443 B1 * | 1/2001 | Lin ........................... 709/208 |
| 6,278,443 B1 * | 8/2001 | Amro et al. ................ 345/173 |
| 6,727,892 B1 * | 4/2004 | Murphy ..................... 345/173 |
| 6,950,539 B2 * | 9/2005 | Bjorn et al. ................ 382/124 |
| 7,411,575 B2 * | 8/2008 | Hill et al. ................... 345/156 |
| 7,489,306 B2 * | 2/2009 | Kolmykov-Zotov et al. . 345/173 |
| 2002/0196238 A1 * | 12/2002 | Tsukada et al. ............ 345/173 |
| 2006/0026521 A1 * | 2/2006 | Hotelling et al. ........... 715/702 |

\* cited by examiner

*Primary Examiner*—Amare Mengistu
*Assistant Examiner*—Robert R Rainey
(74) *Attorney, Agent, or Firm*—Lee & Hayes, PLLC

(57) ABSTRACT

A system to position an element on a visual display is provided. The disclosed system comprises a touch detection module that detects a touch upon a touch-sensitive surface of a visual display. Also included is a position module that receives input from the touch detection module to derive a position of a touch. Further, an offset module derives an offset for an element of a user interface. Methods of using this system are also provided.

14 Claims, 15 Drawing Sheets

SYSTEM AND METHOD FOR FINE CURSOR POSITIONING USING A LOW RESOLUTION IMAGING TOUCH SCREEN

TECHNICAL FIELD

The present invention generally relates to human-computer interfaces and more specifically to systems and methods for controlling graphical user interface elements.

BACKGROUND

Human beings interact with computers through some type of interface. Among the most popular types of interfaces is a graphical user interface (GUI) that displays various interface elements on a visual display to be viewed by a user. Ideally, these interface elements are collected in some type of representative environment and each individual element is a graphical depiction of a real-world object that the user will quickly recognize and find intuitive. For example, a common paradigm for a representative user environment that may be presented on a visual display is the concept of a desktop with elements such as representations of dog-eared pieces of paper to represent documents.

To interact with the computer, the user typically selects an element with which to work. In order to do so, the user positions a pointer or cursor in the vicinity of the desired element. Positioning a pointer or cursor may be done using a positioning device such as a mouse, a trackball, a track pad, a pen and tablet, or a similar device in conjunction with a visual display such as a cathode ray tube (CRT) display or a liquid crystal diode (LCD) display. Alternatively, pressure-sensitive display screens, commonly called touch screens, may be employed as part of the overall user interface. Usually, when a touch screen is used, the user touches the screen at the approximate location of a graphical element to interact with that element as an alternative to using a mouse or other positioning device.

Several types of touch screens are common today. Each type has its own qualities and usually is pixellated. With a first type, called a capacitive system, the screen comprises several layers. A first layer capable of storing an electrical charge is placed on a second layer comprising a glass panel. When the user touches the monitor, a portion of the stored charge of the first layer is conducted from the first layer to the user's body. Therefore, the level of charge stored on the first layer decreases. Associated circuits measure this charge decrease and evaluate the relative differences in charge at each corner of the layer. From this information, the location of the touch event can be derived.

A second type of touch screen operates on a different principle. A surface acoustic wave system includes a pair of transducers arranged along a glass plate. A first transducer is placed along the x-axis of the plate and a second transducer is placed along the y-axis of the plate. One of the transducers operates as a sender and the other as a receiver. Additionally, reflectors are positioned on the glass plate to reflect a signal sent from one transducer to the other. The receiving transducer is able to determine whether a signal sent by the other transducer has been disturbed by a touch event. If so, the location of that touch event on the screen can be discerned.

A third type of touch screen is described as a resistive system. The resistive system incorporates multiple layers and includes a glass panel that is covered with conductive and a resistive metallic layers. Spacers separate the conductive layer and the resistive layer. Typically, a scratch-resistant layer is placed on top of the surface that will be touched by the user. In operation, electrical currents run through both the conductive layer and the resistive layer. When a user touches the screen, the resulting pressure from the touch forces the conductive layer and the resistive layer into contact. A change in the electrical field is detected and coordinates of the point of contact, typically with reference to a two-dimensional x-y coordinate system, such as a Cartesian coordinate system, are determined. Although all three of these touch screen types may be employed in conjunction with the systems and methods disclosed herein, either with or without modifications that will be apparent to ordinary skilled artisans, touch screens based upon resistive systems are particularly well-suited for use.

When using touch screens, the resolution available to detect touch events is commonly far lower than the resolution available to display graphics associated with the GUI. One approach that may be employed is to determine a pixel region on the screen that has been touched by the user and to calculate a relative center pixel that can be used as a single- or sub-pixel position estimate. Even though this approach is possible, there are still associated problems using the calculated position as the point with which a cursor or other pointer is associated. For example, a common pointer in GUI environments is depicted on screen as an arrow. Commonly, the pixel at the very tip of the arrow-shaped pointer is where the focus lies for tasks involving use of the pointer. This configuration allows for fine levels of control for interacting with elements of the GUI. However, when the user touches the touch screen with his finger, the user's finger may be large enough to partially or completely obscure the arrow-shaped pointer from the user's view. This problem is especially acute when using a touch screen to interact with GUI elements that are smaller than the size of the user's finger. Therefore, there is a need for computer users to be able to finely control the positioning of a cursor or pointer when using a touch screen providing relatively coarse levels of touch position detection.

SUMMARY

The following presents a simplified summary in order to provide a basic understanding. This summary is not an extensive overview. It is not intended to identify key/critical elements of the invention or to delineate the scope of the invention. Its sole purpose is to present some concepts of the invention in a simplified form as a prelude to the more detailed description that is presented later. Additionally, section headings used herein are provided merely for convenience and should not be taken as limiting in any way.

One aspect of the invention disclosed herein includes systems and methods to allow a user to exert relatively fine levels of control over a cursor or pointer displayed on a touch screen. Consistent with this aspect, the system determines a position of an area on the touch screen that was contacted by the user's finger and calculates an offset to be applied to the typical pointer position. The system then applies the offset to the pointer position so that the pointer is no longer located under the user's finger but instead is set to a location in front of, and unobscured by, the user's finger.

Another aspect of the disclosed invention provides an ability to switch between coarse and fine levels of cursor or pointer control relatively automatically when a user is interacting with a computing system that includes a touch screen. This aspect detects when the user has placed his hand on the screen to create an anchoring position from which movements of the user's finger or fingers are used to input commands through the GUI. In accordance with this aspect, the system operates to provide a course level of control over the pointer, such as where the pointer is simply positioned at the place where the user touches the screen. When the user has anchored his hand, the system switches modes to provide relatively fine levels of pointer control, such as by calculating an offset for the pointer position. The detection of anchoring can be accomplished in a variety of ways, including the detection of discontinuities in areas detected as touched by the user, detection of movement of a first touched area relative to a second touched area, and with reference to mapping functions both with and without reference to a priori knowledge of human anatomy. These two modes of operation can be reversed as well.

In yet another aspect of the invention, positioning of the pointer takes into account the locations of other GUI elements, for example, the location of an on-screen button. By accounting for locations of other GUI elements, the system can provide more advanced positioning functions. For example, the system can position the pointer over an on-screen button that is associated with a default choice.

In still another aspect of the disclosed invention, GUI elements such as menus are offset from initial rendering positions such that those GUI elements will not be obscured by the user's hand. By offsetting such elements, the system can ensure that the user has an unobstructed view of available commands or options. In this manner, the system makes the user's task of operating the system easier.

In yet a further aspect of the invention, an offset for an element of a GUI can be varied as a function of positions of GUI elements presented on a display. For example, when a number of small elements are positioned close together, the invention can increase the offset of a GUI element such as a pointer from the user's hand. When GUI elements are spaced further apart, the amount of offset can be reduced. This scheme can help prevent the user's hand from obscuring displayed GUI elements.

Still another aspect of the invention involves detecting features of areas touched and using those features to identify a specific user. When a specific user is identified, a set of preferences can be applied to customize operation. For example, a user preference can be applied to vary an amount of offset applied to an element such as a pointer. Additionally, a preference that indicates desired positions of GUI elements to be offset can be applied. Application of these preferences can be performed automatically upon identification of the user.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE DRAWINGS

Figure 1:
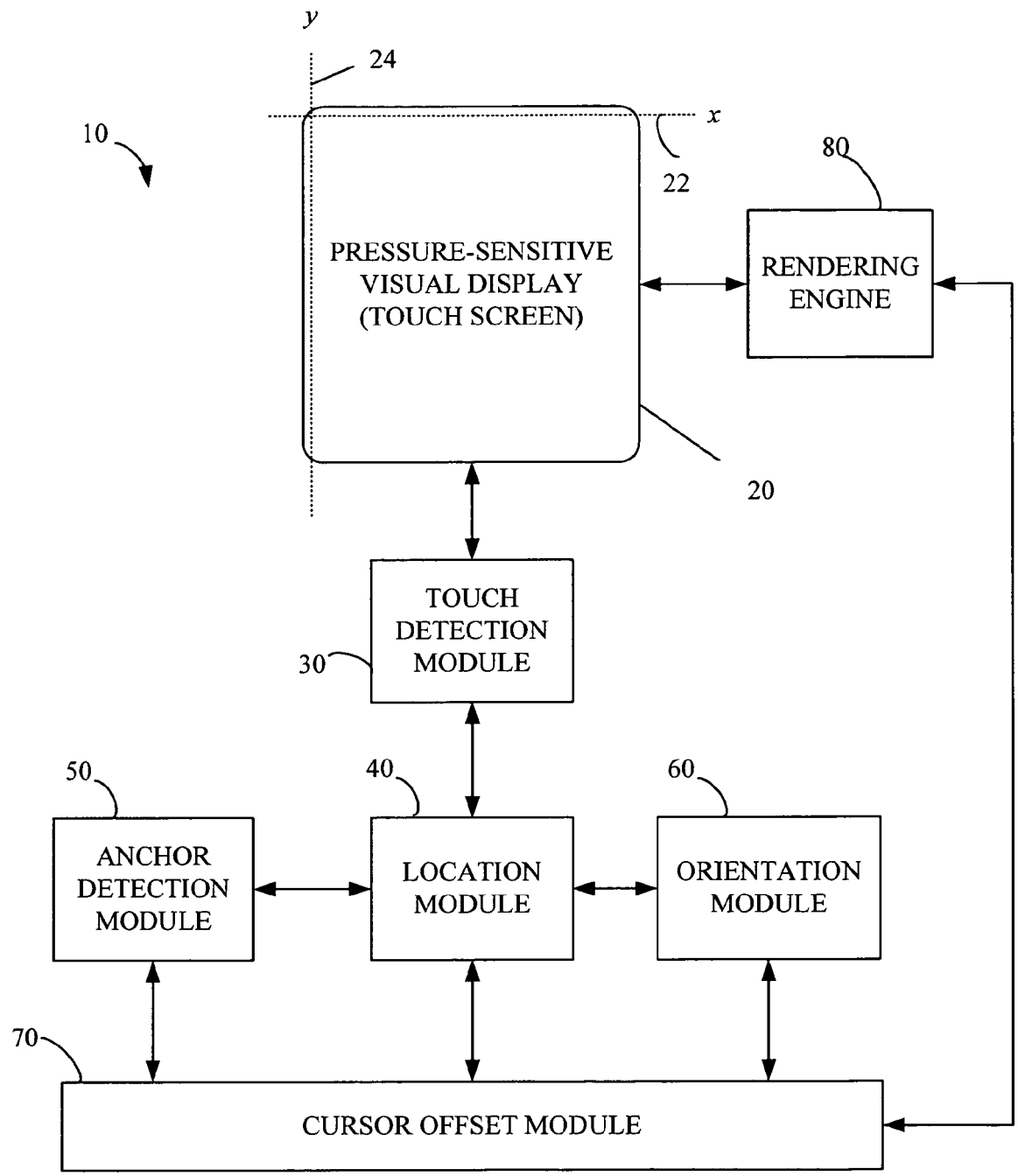
FIG. 1 is a high-level block diagram of a cursor or pointer positioning system in accordance with one aspect of the invention.

The subject invention relates to systems and methods for positioning a cursor or pointer in a computing environment that includes a graphical user interface (GUI). The disclosed systems and methods aim to adjust cursor or pointer positioning behavior for users of computing systems including a pressure-sensitive visual display, commonly referred to as a touch screen.

As utilized in this application, terms "component," "module," "system," and the like are intended to refer to a computer-related entity, either hardware, software (for example, in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. Also, the terms "cursor" and "pointer" are used interchangeably and specifically include line cursors, block cursors, arrow-shaped pointers, dot-shaped pointers, and any other indicator of a position on a visual display.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

FIG. 1 depicts a cursor positioning system 10. The cursor positioning system 10 includes a pressure-sensitive visual display 20. The pressure-sensitive visual display 20 is commonly referred to as a touch screen and can be configured to be responsive to data input events in the form of a touch of a user upon a surface of the display. Various types of touch screens may be employed, including those that operate on capacitive, acoustic-wave, or resistive principles. Additionally, use of the term touch screen includes screens that are vision-based or capacitance-based, among others, especially those in which proximity to a surface is detected instead of, or in addition to, pressure upon a screen surface. Typically, and as a convention that will be followed herein, the surface of the touch screen is described as generally planar and includes a generally horizontal axis referred to as the x-axis 22 as well as a generally vertical axis referred to as the y-axis 24.

Various examples presented implicitly assume that a touch screen has the capability to provide an observation at each point of contact with the screen (an "imaging touch screen"). Such a screen is not required for other examples and may be readily used with touch screens that simply provide a coordinate of a center of a touched area. In cases where an imaging touch screen is assumed, such assumption should not be taken as a statement that the example cannot be implemented without using an imaging touch screen, albeit possibly with some modification to the screen. Rather, these assumptions should be interpreted as preferring an imaging touch screen in a particular example.

As another convention used herein, touch screens will be described as having two resolutions: a visual or display resolution and a touch resolution. Generally, either type of resolution can be described as a function of the number of pixels in the screen. The more pixels that are available, the higher the resolution. Pixels are usually arranged as a two-dimensional grid generally along the x- and y-axes of the screen, such as x-axis 22 and y-axis 24. Each pixel can thus be identified by a unique (x, y) coordinate pair and typically each pixel is individually addressable.

Visual or display pixels can be arranged as part of a visual layer that includes the described two-dimensional grid. Similarly, touch pixels can be arranged in a two-dimensional grid as part of a second layer. The number of pixels employed in the touch layer is usually less than the number used for the visual layer, yielding a lower resolution for the touch layer than for the visual layer. In cases where the resolution of the touch layer is lower than the resolution of the visual layer, a mapping function can be defined to correlate the (x, y) coordinates of a touch pixel to one or more pairs of (x, y) coordinates corresponding to visual pixels.

The pressure-sensitive visual display 20 is communicatively associated with a touch detection module 30. The touch detection module 30 is typically configured to detect a touch event initiated by a user and to activate the operation of other components that are discussed in detail later to derive further information related to the detected touch event. For example, as further depicted in FIG. 1, the touch detection module 30 is associated with a location module 40. The location module 40 is configured to ascertain a location of a touch event upon the pressure-sensitive visual display 20. Customarily, a location is represented as an ordered (x, y) pair and this representation is suited for use with the cursor positioning system 10. Positive changes in values along the x- or y-axes indicate changes in position to the right or up, respectively. Negative changes in values along the x- or y-axes indicate changes in position to the left or down, respectively. Additionally or alternatively, and as is suited for use with some aspects of the cursor positioning system 10, the location module 40 can be configured to ascertain a set of (x, y) coordinate pairs relating to a set of pixels that were touched by the user.

The location module 40 is associated with an anchor detection module 50. The anchor detection module 50 can be configured to detect an anchoring event. The concept of "anchoring," as used herein, refers to the relatively fixed placement of a hand of the user while using the pressure-sensitive visual display 20. The concept of anchoring is derived from an observation that when a user interacts with a touch screen for relatively coarse control operations such as depressing on-screen buttons, the user typically contacts the touch screen using a tip of a finger, usually the index finger. When exerting finer levels of control, for example, selecting small GUI elements, the user contacts the screen with more of his hand, usually including one or more other fingers or the base of the palm of his hand. When more than simply a single fingertip is in contact with the surface of the touch screen, the user is said to have "anchored" his hand or that an "anchoring event" has occurred.

An orientation module 60 is also associated with the location module 40. The orientation module 60 is configured to derive an orientation of a user's finger on the pressure-sensitive visual display 20. For example, the user's finger may be substantially vertical or more typically may be deflected some number of degrees from vertical. As explained more fully below, an orientation derivation may occur whether or not the user's hand is anchored by using one or more techniques.

A cursor offset module 70 is associated with the location module 40, as well as the anchor detection module 50 and the orientation module 60. The cursor offset module 70 is configured to use information relating to a user's touch, specifically including location, orientation, or anchoring information to determine whether to offset a cursor depicted on the visual display and if an offset should be applied, by how much. For the purposes of this document, the term "offset" refers to an amount by which a position of a cursor or pointer is adjusted from an initial reference position at which the pointer would reside without the application of an offset. The term "offset" specifically includes the value of zero, or no offset.

An offset may be described in terms of a signed (x, y) value pair that represents amounts by which an activation point of the cursor or pointer is to be adjusted. The "activation point" is that portion of a cursor or pointer that must be positioned within the bounds of a GUI element in order for the user to be able to select that element, for example, by clicking a mouse or tapping on a touch screen. Typically, a body of a pointer is rendered on a display relative to the activation point. For example, if the activation point of a pointer initially resides at (x, y) coordinates (150, 200) and an offset of (−5, 10) is applied, the activation point of the pointer (and consequently, the body of the pointer object) will be shifted. The activation point will then reside at (x, y) coordinates (145, 210). The cursor offset module 70 is also associated with a rendering engine 80. The rendering engine 80 is configured to receive offset information from the cursor offset module 70 and display the pointer on the display at the appropriate coordinates. As previously mentioned, the appropriate position may or may not include an offset.

The cursor offset module 70 can also compute gain to be applied to motion of a cursor or pointer. Gain refers to scaling of motion of an input to motion of an output or controlled component. For example, if a user moves his finger across a surface of a touch screen at a first rate of motion, the cursor offset module 70 can apply a gain calculation to the finger motion to cause a cursor or pointer to move across a screen at a second rate of motion. For example, a user may move his finger relatively slowly but the cursor or pointer will move very quickly, or vice-versa. An analogous concept is moving a finger a short distance that results in a large distance of movement of a cursor or pointer on-screen, or vice-versa. Application of gain calculations can provide greater levels of control over cursor or pointer movements.

In operation, the pressure-sensitive visual display 20 serves to present the GUI to a user and accept input from the user in the form of touches on the surface of the screen. The touch detection module 30 detects when a user has touched the surface of the pressure-sensitive visual display 20 and activates the location module 40. The location module 40 derives the location of the user's touch in the x-y coordinate plane using at least one of several available methods. As will be apparent to those of ordinary skill in this art, the exact method or methods employed to determine the location of the user's touch will typically depend on the specific type of touch screen employed as the pressure-sensitive visual display 20.

The location module 40 is associated with the anchor detection module 50, which determines whether an anchoring event has occurred. A variety of methods may be employed to determine whether a user has anchored his hand, including the detection of discontinuous shapes on the pressure-sensitive visual display 20, derivation based upon heuristic or other suitable algorithms, detection of movement of a portion of a touched area combined with non-movement of another area, and using knowledge related to the anatomy of a human hand as part of a coordinate system. These methods are discussed in further detail in conjunction with other figures.

The orientation module 60 determines first what part of an area that has been detected as touched by the user is to be treated as a portion primarily associated with a pointer and second, that determined portion's relative orientation in a two-dimensional x-y coordinate plane associated with the pressure-sensitive visual display 20. Several methods are available to orient the pointer portion in the x-y coordinate plane and such methods are discussed in conjunction with other figures.

The cursor offset module 70 uses location information from the location module 40, anchoring information from the anchor detection module 50, and orientation information from the orientation module 60 to derive a cursor offset. For example, one possible application is that if the anchor detection module 50 indicates to the cursor offset module 70 that no anchoring has occurred, the cursor offset module 70 may determine that no offset should be applied and send an offset value pair of (0, 0) to the rendering engine 80 which will then position and render the cursor at the place where the user touched the screen. This mode of operation may be referred to as absolute cursor positioning in that wherever the user touches the screen, that is, where the cursor will be positioned and rendered.

A second mode of operation may be referred to as relative cursor positioning and may be triggered by the existence of an anchoring event. In this mode, the cursor offset module 70 receives from the anchor detection module 50 an indication that the user has anchored his hand. The cursor offset module 70 then uses location information from the location module 40 and the orientation module 60 to determine an appropriate offset value pair. For instance, if the orientation module indicates that the user's finger is the pointer portion of the detected touched area of the screen and is oriented in a position that is deflected approximately forty-five degrees (45°) counter-clockwise from vertical, the appropriate offset may be determined to be up and to the left (for example, a negative amount along the x-axis 22 and a positive amount along the y-axis 24) from the user's finger. With this offset, the pointer will appear on-screen to be in front of and to the left of the user's finger.

Relative cursor positioning has a number of uses. To the extent that occlusion of the pointer by a portion of a hand of a user is an issue, an offset from a touched position can ensure that a pointing component, or another component to which an offset can be applied, remains visible to the user. Also, use of an offset can mitigate issues that arise from the fact that there is no unambiguous "tip" of a finger as there is with an on-screen pointer.

The exact amount of an offset to be applied can be determined using a variety of methods. For instance, the amount may be pre-determined at implementation as a fixed offset amount. Alternatively the offset amount can be dynamically derived from location and orientation information based upon the amount of area detected as touched by the user's hand. Additionally the offset amount can be selected by the user through a GUI control interface such as a control panel. According to the needs and desires of a specific implementer, a combination of these approaches may be employed.

Figure 2:
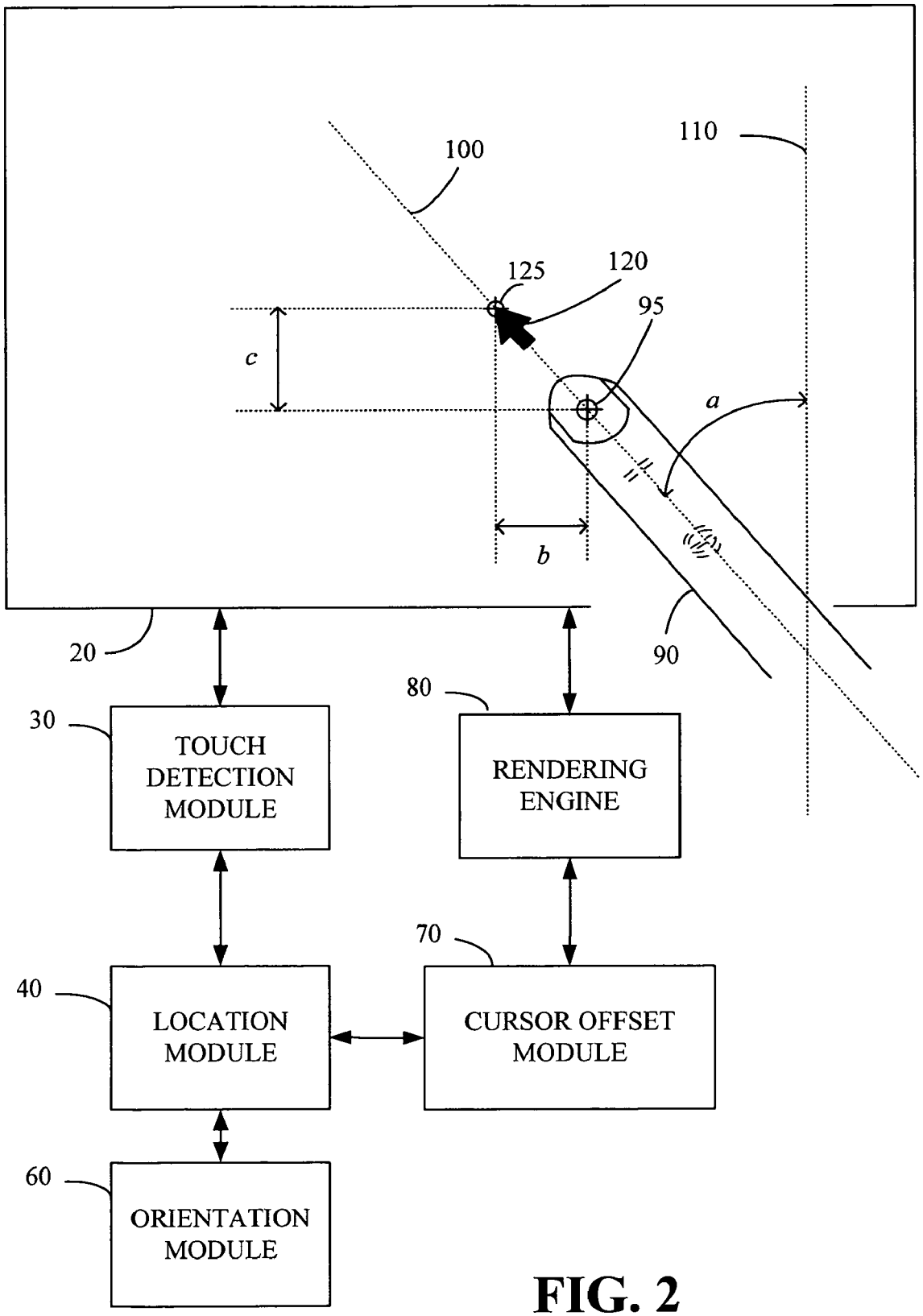
FIG. 2 is a block diagram of a cursor or pointer positioning system in accordance with another aspect of the invention.

FIG. 2 depicts a portion of the cursor positioning system 10 in use by a user. As described with reference to FIG. 1, the pressure-sensitive visual display 20 is associated with the touch detection module 30, which in turn is associated with the location module 40. The orientation module 60 is also associated with the location module 40, as is the cursor offset module 70. The rendering engine 80 is associated with the cursor offset module 70 and also the pressure-sensitive visual display 20.

A finger of a user 90 is depicted touching the surface of the pressure-sensitive visual display 20. A center marker 95 depicts the approximate center of the area of the first segment of the user's finger 90 that is in contact with the surface of the pressure-sensitive visual display 20. The finger 90 is aligned with a diagonal reference axis 100 that intersects a vertical reference axis 110. As depicted, an angle a that measures approximately forty-five degrees (45°) from the vertical axis 110 describes the general orientation of the finger 90. A pointer 120 created by the rendering engine 80 is depicted as having an activation point at a tip of its head 125 and offset along the x-axis of the pressure-sensitive visual display 20 by a distance b measured from the center marker 95 to the activation point of the pointer 120. The pointer is also displaced along the y-axis of the pressure-sensitive visual display 20 by a distance c measured from the center marker 95 to the activation point of the pointer 120. Following the convention set forth earlier, because the direction of displacement along the x-axis is to the left (when viewed from the perspective of the user, as depicted in FIG. 2), the value assigned to distance b will be negative. Similarly, because the direction of displacement along the y-axis is up, the value assigned to distance c will be positive.

Figure 3:
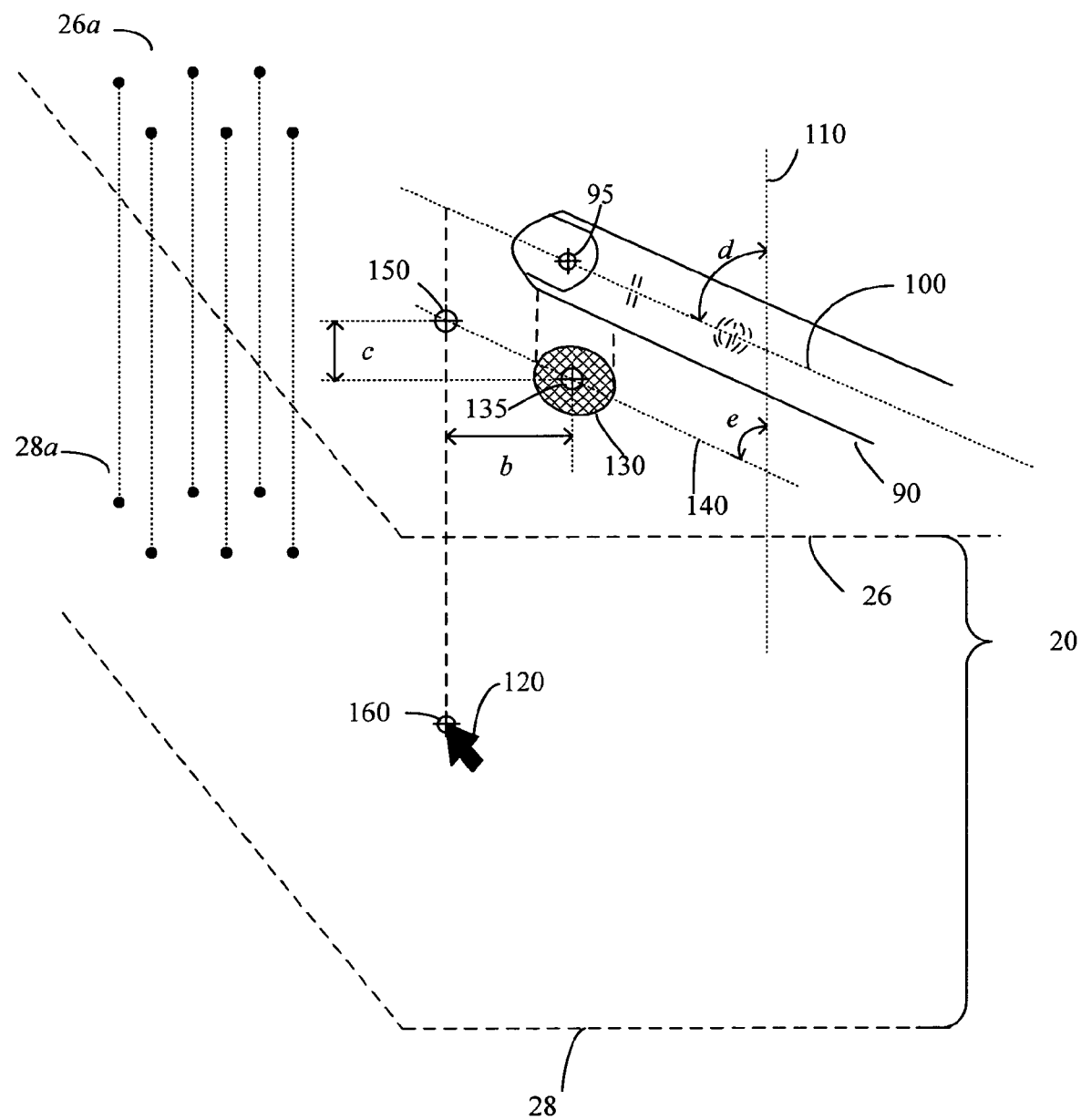
FIG. 3 is a block diagram of a cursor or pointer positioning system in accordance with still another aspect of the invention.

FIG. 3 depicts further aspects and details of the cursor positioning system 10. The pressure-sensitive visual display 20 is depicted as having a touch layer 26 upon which the finger 90 of the user comes into contact and a visual layer 28. Touch pixels 26a associated with the touch layer 26 are mapped to visual pixels 28a. Although touch pixels 26a and visual pixels 28a are depicted in a one to one (1:1) mapping arrangement, it should be appreciated that other mappings of more visual pixels to touch pixels are not only possible but likely to be employed in a typical touch screen. Those of ordinary skill in this art will also appreciate that described aspects of the pressure-sensitive visual display 20 may differ according to specifics of a particular type or model of touch screen employed but that the systems and methods discussed may need only minor modifications, if any, to tailor an implementation of these disclosed systems and methods in a particular instance.

The finger 90 of the user is again depicted as aligned along the diagonal reference axis 100 that intersects the vertical reference axis 110. A deflection angle d is the amount by which the finger 90 is deflected from vertical. The center marker 95 depicts the actual center of the area of the first segment of the finger 90 that is in contact with the pressure-sensitive visual display 20. An area 130 is generally elliptical and depicts a set of touch pixels detected as touched by the finger 90. A center marker 135 depicts the center of the area 130. In this example, the actual location of the center marker 135 is derived by the location module 40 using information about the area 130. For instance, the location module 40 can attempt to fit the area 130 into one of a set of preselected geometric shape representations, such as a circle, an oval, an ellipse, a square, a rectangle, or other suitable bounded or unbounded curves or polygons. Once a fit has been made, traditional algorithms can be used to calculate the center of the shape.

Ideally, the location of the calculated center 135 matches the true center 95. However, it will be appreciated that some deviation is likely, including deviation caused by mapping from a low resolution touch layer to a high resolution visual layer. Such deviation may even be desired in implementations that choose to use a "best fit" or "rough estimate" approximation algorithm for reasons such as algorithm speed or the conservation of scarce computing resources. It should also be appreciated that this particular computing task, as well as others described herein, may be accomplished using not only general-purpose computing processors, but also by using a variety of parallel architectures, including specifically off-loading tasks to a dedicated graphics processing unit (GPU).

The orientation module 60 (not shown) can derive the general orientation of the finger 90 of the user by a variety of methods. One example uses information regarding the geometric shape into which the location module 40 fit the area 130. For instance, when the area 130 is fit into an ellipse, a heuristic algorithm may take into account that an ellipse has both a major axis and a minor axis and that the best fit for an elliptical shape on the first segment of a finger such as the finger 90 is with the major axis of the ellipse aligned with a longitudinal axis running along the length of the finger, such as depicted with the diagonal axis 100. The major axis 140 of the ellipse into which area 130 was fit can then be used as a proxy for the diagonal axis 100. Ideally, the major axis 140 is parallel to the diagonal axis 100, as depicted by angle e with reference to the vertical reference axis 110 which is equal to angle d. As discussed above, when performing this computing task, the two axes may not in fact be truly parallel for reasons of efficiency or other design or implementation choices made.

The cursor offset module uses the location of the center 135, the position of the major axis 140, and the distances b and c to calculate an offset position 150 along the major axis 140. The distances b and c are typically in the form of a signed (x, y) value pair. The offset position 150 is then mapped from the touch layer 26 to a corresponding position 160 on the visual layer 28. The rendering engine 80 positions the activation point of the pointer 120 at the corresponding position 160 and renders the body of the cursor appropriately, here depicted as along the diagonal axis 100. Alternatively, mapping between the touch layer 26 and the visual layer 28 may take place first by correlating the position of the center 135 of the area 130 to a point on the visual layer 28 and then applying the offset to reach the position 160.

Figure 4:
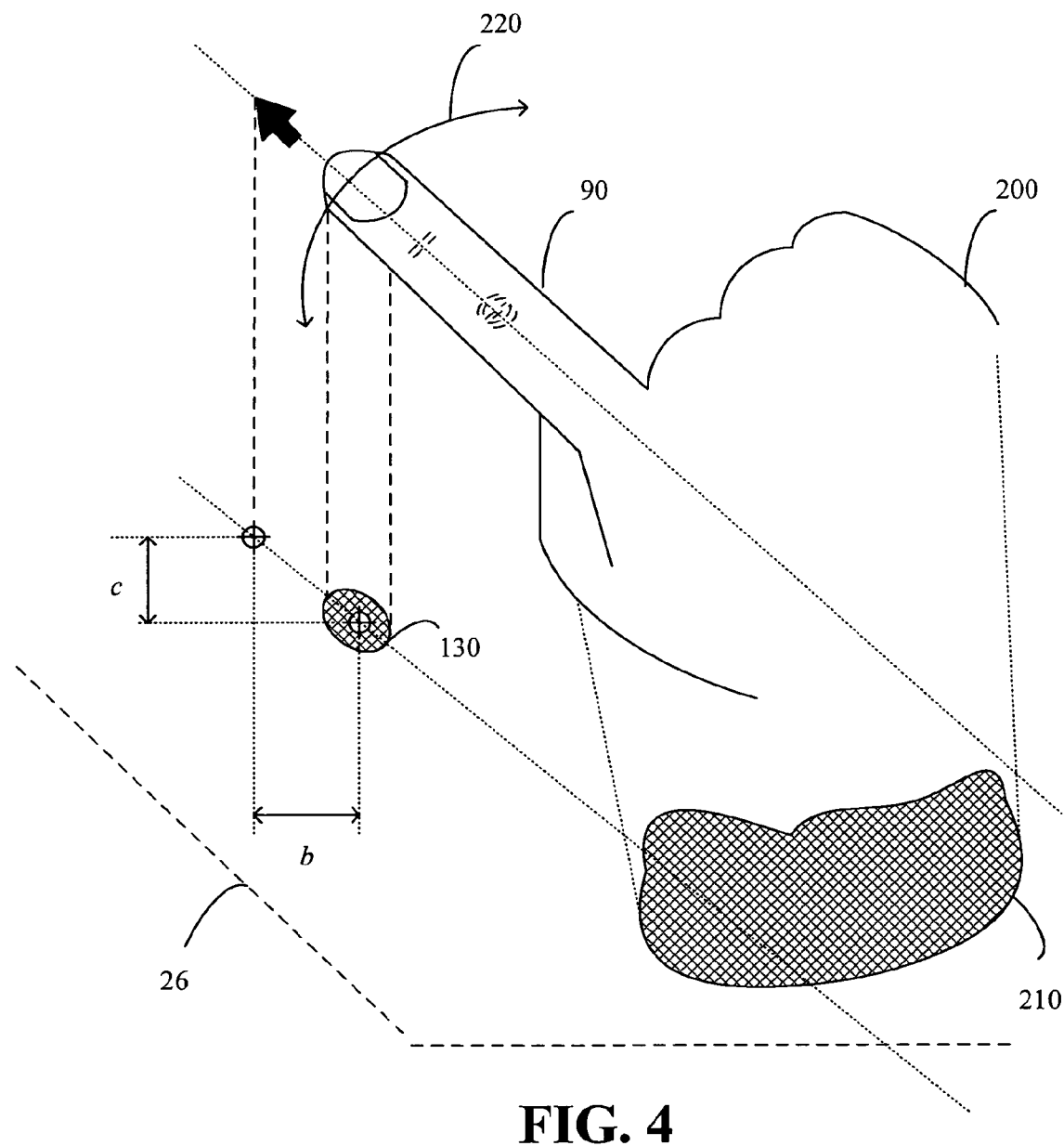
FIG. 4 is a block diagram of a cursor or pointer positioning system in accordance with yet another aspect of the invention.

FIG. 4 depicts a hand 200 of a user in an anchored position on the touch layer with the finger 90 being used as a pointer portion from which a pointer offset may be derived. An area 210 on the touch layer 26 is the area of contact between the heel of the hand 200 and the touch layer 26. The anchoring of the user's hand on the touch screen can be used as an indication to switch between or among available modes of pointer offset behavior. If desired, the cursor positioning system 10 can be run solely in a cursor offset mode using the systems and methods disclosed herein. However, anchoring detection provides a convenient indicator that can be used to switch between relative cursor positioning and absolute positioning to take advantage of the fact that some tasks, such as simply operating an on-screen button, do not require the fine level of pointer control that relative positioning provides.

Detection of anchoring can be used to switch between other modes of behavior or control functions as well. For example, detection of anchoring could be used to zoom into a region of a GUI to provide a better view of the region. In a painting application, for instance, detection of anchoring, or an amount of anchoring, can be used to control thickness of an on-screen paintbrush. Other applications of mode switching or function control or both are possible. A more detailed discussion of the concept of an amount of anchoring, as opposed to simply detecting whether an anchoring event has occurred, is provided below.

Detection of anchoring can also be used as part of calculating an orientation. For example, a position of an anchored region can be calculated and used with a position of a finger touch to calculate a line between the two positions. That calculated line can be used to determine an orientation of a finger, cursor, pointer, or other component.

The anchor detection module 50 (FIG. 1) can determine whether an anchoring event has occurred using a variety of methods. Some of those methods may include the use of a priori information about the anatomy or physiology of the human hand. For example, the shape of the human hand is well-known. By comparing the shape of the area 210 with a reference model of the shapes of areas of contact between regions on the palm-side of the hand when placed on a planar surface in a variety of positions. A high degree of correlation between a shape of a detected area of touch such as area 210 and a shape represented in the reference model can trigger a determination that anchoring has occurred.

A second technique includes the detection of movement on the touch screen. For example, if the area 130 is determined to be moving, especially in a generally arc-shaped travel path, such as travel path 220, relative to the area 210 which remains in a substantially fixed position, the anchor detection module 50 can determine that the area 210 is formed by the base of the user's hand and that the area 130 is formed by the touch of the tip of the user's pointer finger (albeit the index finger or another finger used as the pointer finger) and generate an anchoring event. This technique may be used as an alternative or supplement to the previously described model-based shape matching approach.

A third approach, which may be used as an alternative or supplement to either or both of the previously described techniques, is to reason from the fact that discontinuous areas of contact have been detected. For example, as shown in FIG. 4, the area 130 formed by the touch of the user's finger is discrete from the area 210 formed by the touch of the base of the user's hand. If these two areas are within the proximity expected for the touch of an anchored human hand, the anchor detection module 50 can generate an anchoring event. A number of suitable algorithms are available for determining whether detected touched regions are continuous, including algorithms from the image processing areas that readily can be adapted to operate on touch pixels instead of image pixels. A corollary approach is to detect discontinuities in time between touches. For example, if two touches are detected within a preselected amount of time, such detection can be used to trigger an anchoring event. Other manners of incorporating time into detection of anchoring are possible and will be evident to those of ordinary skill in the art.

A fourth approach, which also may be used as an alternative or supplement to the previously described techniques, is to set up a function representing a degree to which the user's hand can be said to be anchored. Depending on the level of sophistication desired by an implementer, such a function could be continuous, discontinuous, or discrete. One of the simplest possible examples is to create a linear function that simply represents the number of pixels simultaneously touched by the user. A threshold value (e.g., a minimum number of pixels) along the function can then be chosen with an anchoring event (e.g., a variable flag) being set when the threshold is exceeded and unset when the function value falls below the threshold. Of course, more complex functions that take into account possible discontinuities in the shapes of areas touched by the user's hand or other variables can be used.

The subject invention (e.g., in connection with selection) can employ various artificial intelligence based schemes for carrying out various aspects thereof. For example, a process for determining whether a user has anchored his hand can be facilitated via an automatic classifier system and process. Such classifier system and process can be used in conjunction with any of the approaches described above and may be especially useful where pattern-matching functionality is desired, such as when coordinate maps are employed or when information relating to shapes of anatomical structures is used.

A classifier is a function that maps an input attribute vector, $X=(x_1, x_2, x_3, x_4, \ldots x_n)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of pattern or shape matching, for example, attributes can be appropriate shape descriptors such as mathematical functions and/or values, or other data-specific attributes derived from the area of a touch-sensitive screen that was detected as touched, and the classes are categories or areas of interest such as models of anatomical structures.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., using generic training data) as well as implicitly trained (e.g., by observing user behavior, receiving extrinsic information). For example, SVMs are configured using a learning or training phase within a classifier constructor and feature selection module. Thus, the classifier(s) can be used to automatically perform a number of functions, including but not limited to determining when a event, such as an anchoring event, has occurred according to a predetermined criterion or criteria.

An artificial intelligence-based component can be employed specifically to perform anchoring detection. Such systems are well suited for pattern-matching tasks, such as those that can be performed to determine whether a user has anchored his hand based upon a shape or shapes of a detected touch upon a surface of a touch-sensitive display. Additionally or alternatively an artificial intelligence-based component can be used to determine orientation and determine whether a user has used his right or left hand, among other tasks or functions.

Figure 5:
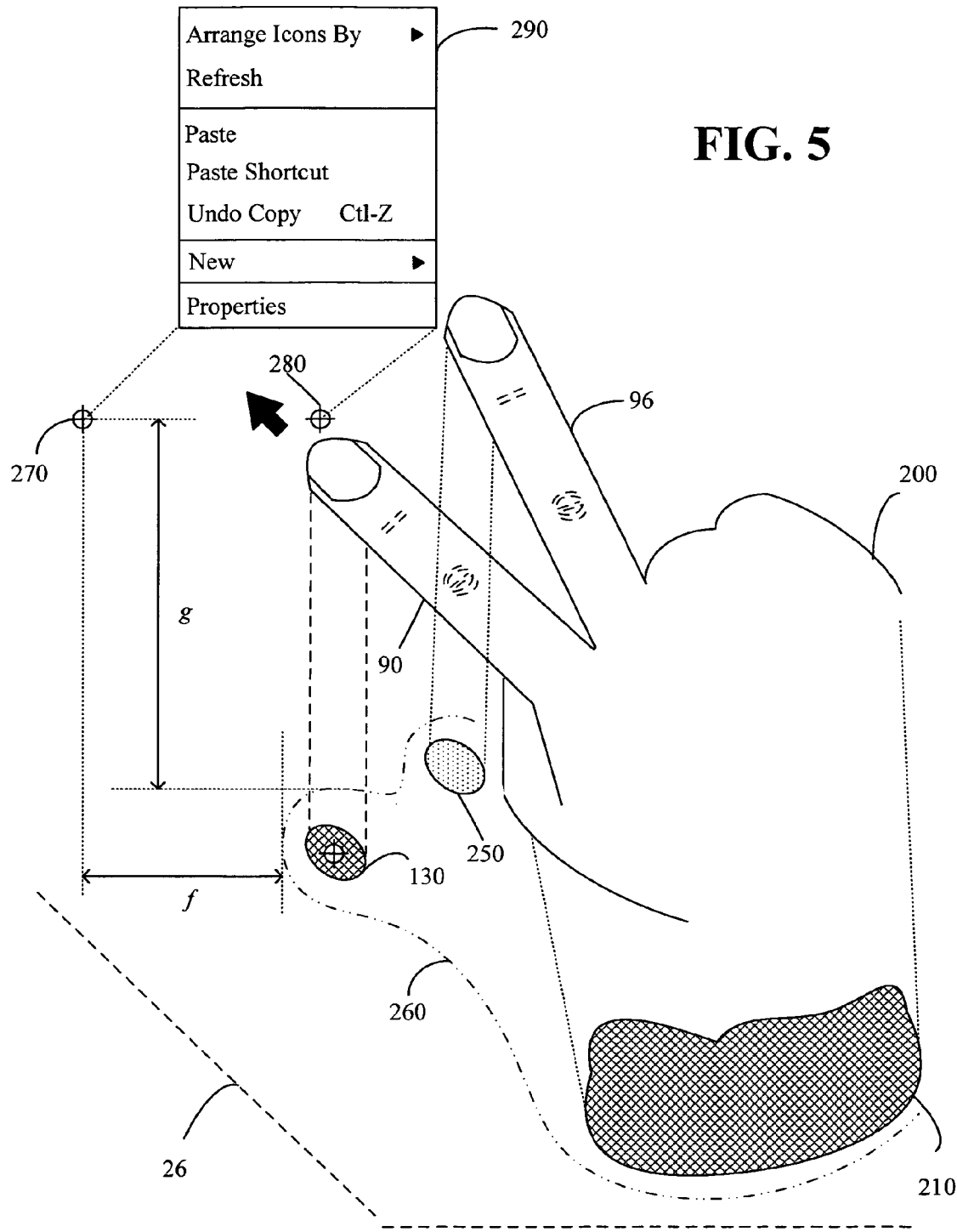
FIG. 5 is a block diagram of a cursor or pointer positioning system in accordance with a further aspect of the invention.

The disclosed technique of offsetting a pointer can be adapted for other GUI elements as well. For example, FIG. 5 depicts use with a command menu. The user's hand 200 is depicted in contact with the touch layer 26 at area 130 (index finger) and area 210 (heel of hand). Additionally, a second finger 96 is depicted as having tapped the touch layer 26 at area 250. An anchor detection module (not pictured), such as the anchor detection module 50, uses information about the touched areas to derive a "no-render" zone within partially-depicted boundary 260. The no-render zone is calculated to estimate the approximate total screen area covered by the hand 200 of the user. Elements of the GUI such as menus or pointers will not be rendered within the no-render zone so that user-selectable controls will not be obscured from the user's view by the user's hand 200.

When the user taps the touch surface 26 with the finger 96 to activate a menu, an offset module, such as the cursor offset module 70, calculates offsets 270, 280 by determining distances along the x- and y-axes, such as distances f and g, respectively, for corners of a menu 290. A rendering engine, such as the rendering engine 80, will render the menu 290 at an appropriate place on the screen, taking into account the offsets calculated by the offset module and the coordinates within the no-render zone. In this manner, GUI elements can be displayed to the user without being obscured from view.

Still more sophisticated behavior is possible by taking into account on-screen locations of GUI elements such as buttons. For example, when the user positions his hand on the touch screen, the cursor positioning system 10 may, through the use of components such as the location module 40, take into account a priori knowledge of the layout and sizes of GUI elements to provide pointer behavior such as a "snap-to" function to position the pointer over a GUI element in the vicinity of the rendered offset pointer.

Figure 6:
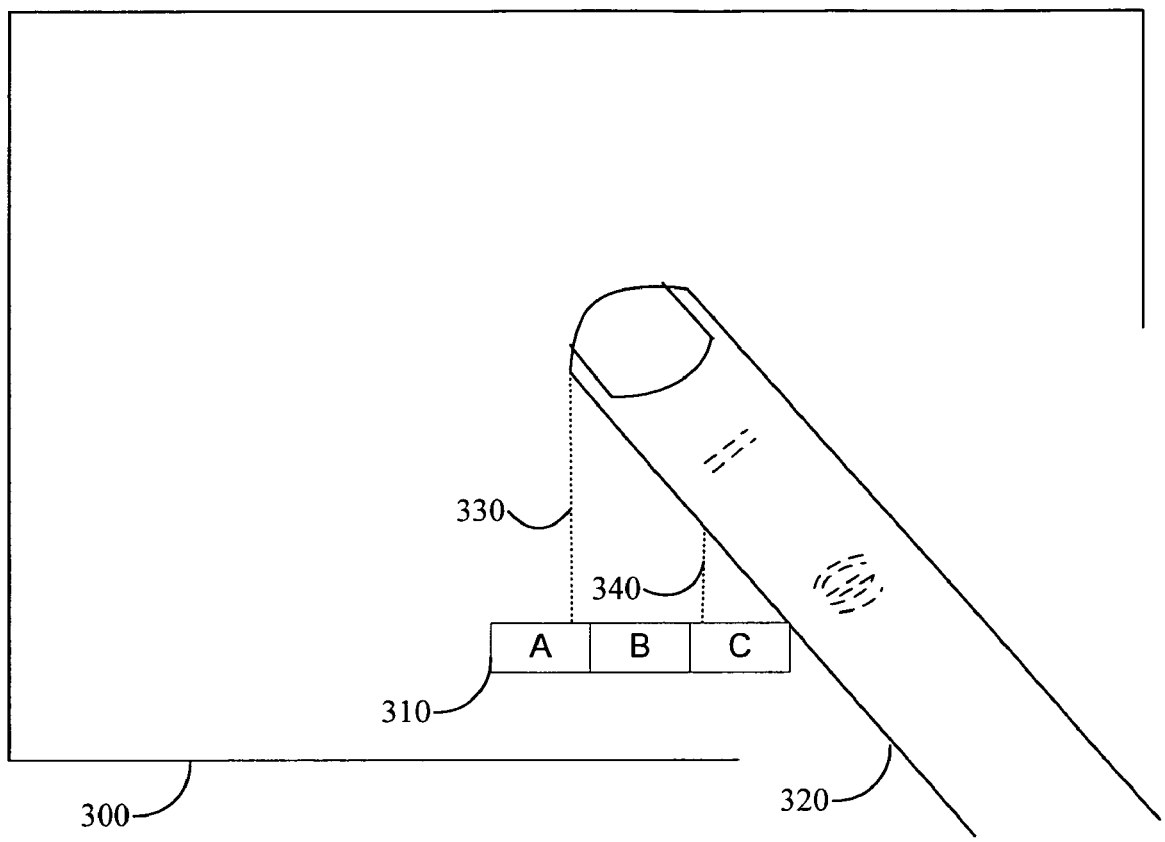
FIG. 6 is a diagram of a portion of a touch-sensitive display in use with a GUI.

FIG. 6 is a diagram of a portion of a touch-sensitive display 300 in use with a GUI, of which a portion is pictured. The GUI includes a group of GUI controls 310 that are individually labeled A, B, and C. Each of the controls A, B, and C can be, for example, an on-screen button that is mapped to a program function that is executed upon activation of the button by clicking or otherwise selecting the button. A finger 320 of a user's hand is shown positioned above the group of GUI controls 310 for perspective and clarity of presentation. In use, the finger 320 of the user will normally be in contact with a surface of the touch-sensitive display 300.

Perspective lines 330, 340 are shown leading from underneath an end of the finger 320 of the user to the surface of the touch-sensitive display 300. A region between the perspective lines 330, 340 indicates a region of contact between the finger 320 of the user and the surface of the touch-sensitive screen 300. As shown, that region of contact covers not only all of control B, but also portions of control A and control C. If the user has only his finger with which to select controls of the GUI, selecting individual controls can be difficult at least partly because of relative size differences between the finger 320 of the user and individual controls of the group of GUI controls 310. It should be noted that in this example, the user merely touches the surface of the touch-sensitive display 300 to select or otherwise operate GUI controls such as those included in the group of GUI controls 310.

In operation, the user can touch the surface of the touch-sensitive display 300 in the region of the group of GUI controls 310 with his finger 320 to cause the touch-sensitive display to register a touch event. In one example, depending upon the particular type of touch screen used, the touch can be interpreted as occurring at a single pixel that can be within a region of an individual control of the group of GUI controls 310. In such case, the touch can be interpreted as selecting the individual control. Because the finger 320 obscures view of the individual control of the group of GUI controls 310, the user can be uncertain whether he has selected or activated the individual control he intended to activate.

In another example, also depending upon the type of touch-sensitive display employed, the touch can be detected as occurring at a group of pixels. The area of this group can be larger than the area of a control the user intends to select or activate. If so, the user can find that the touch has selected or activated an intended control, more than one control including the intended control, more than one control not including the intended control, or no control at all. Again, user uncertainty as to what is being controlled can result. Other scenarios are possible depending upon the type of touch-sensitive display used and GUI employed, among other factors.

Figure 7:
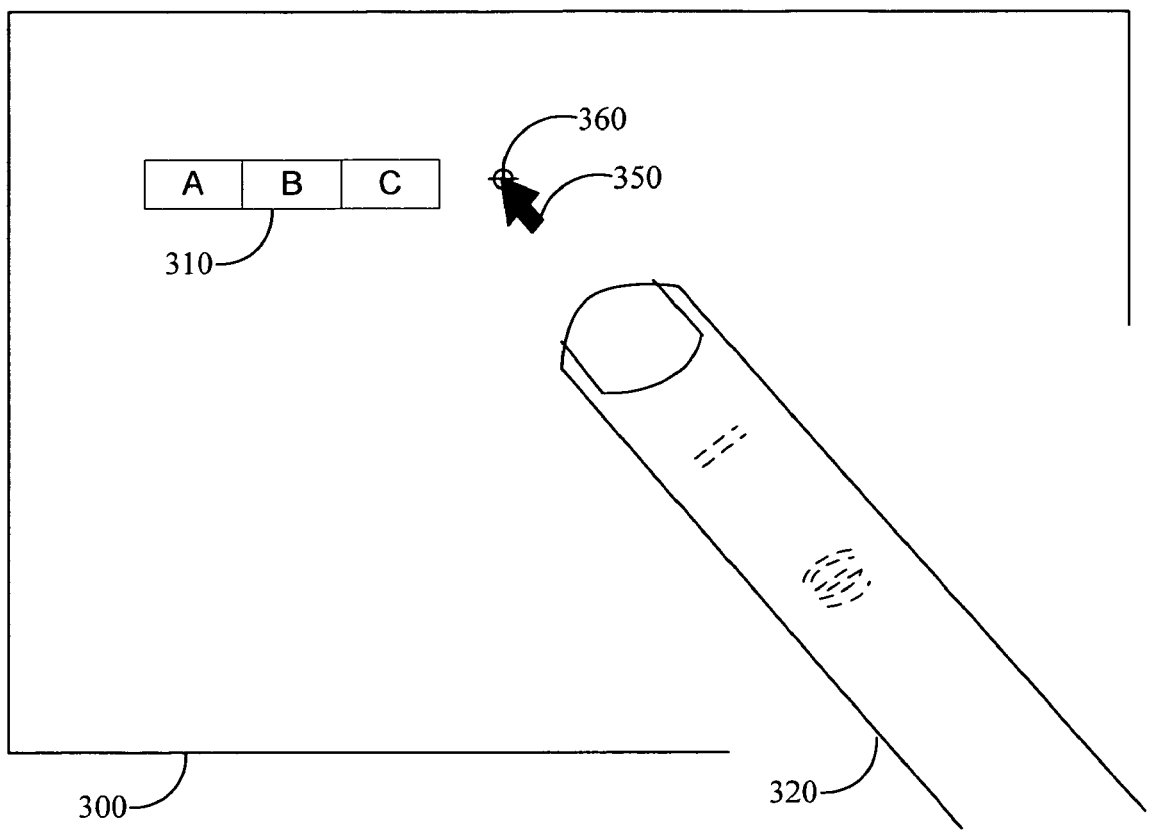
FIG. 7 is a diagram of a portion of the touch-sensitive display in use with a cursor offset system.

FIG. 7 depicts a portion of the touch-sensitive display 300 in use with a cursor offset system applied. A pointer 350 includes a tip 360 that can be a point of activation in the sense that use of the pointer to select or activate GUI elements such as those of the group of GUI controls 310 can be performed by positioning the tip 360 of the pointer 350 over a control to be selected or activated. The pointer 320 is shown offset a distance from the tip of the finger 320 of the user.

As shown, the tip 360 of the pointer 350 is smaller than any of the individual controls of the group of GUI controls 310. Typically, the tip 360 of the pointer 350 is a single pixel. Such a size differential between the individual controls of the group of GUI controls 310 and the tip 360 of the pointer 350 can enable control at a finer level of granularity than simply using the finger 320 of the user.

In operation, the user can touch the surface of the touch-sensitive display 300 with his finger 320. The pointer 350 can be positioned in front of the finger 320 such that view of the pointer 350 is not obscured by the finger 320. The pointer 350 can be positioned relative to the finger 320 such that the pointer 350 moves as the finger 320 moves. The tip 360 of the pointer 350 can be the reference point that is used to determine what, if any, portion of the GUI is selected or activated by the user.

The user can move the finger 320 to cause the pointer 350 to move such that the tip 360 of the pointer 350 is within an area of a control to be selected or activated. Using the tip 360 of the pointer 350 provides finer control ability as well as an unobscured view of the region, in this case, the tip 360 of the pointer 350) that can be used for selection or activation of GIU controls. The potential for user confusion regarding what control the user is selecting or activating, if any, can thereby be reduced.

Figure 8:
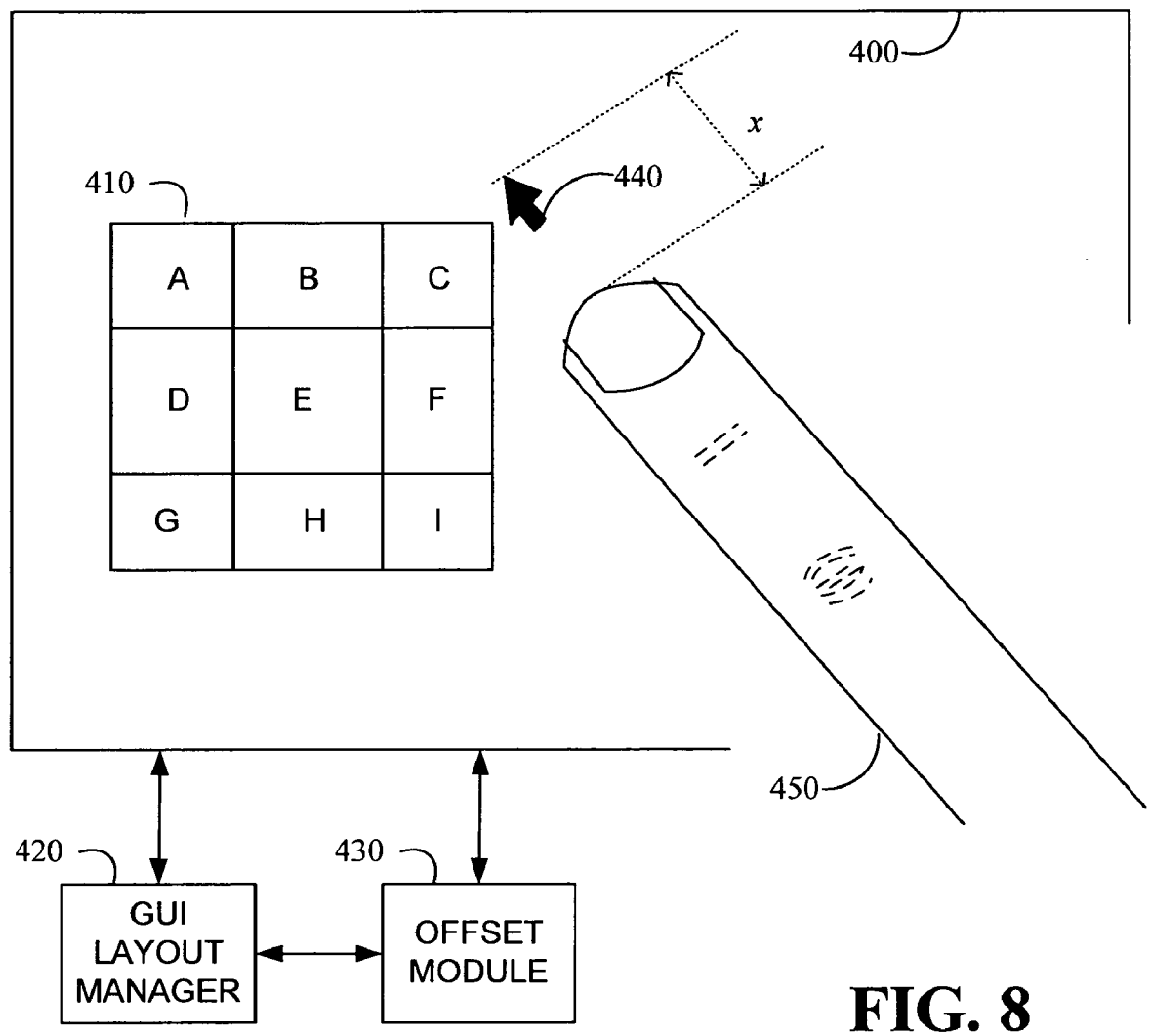
FIG. 8 is a diagram of a touch-sensitive display with a portion of a GUI shown.

FIG. 8 is a system block diagram of a touch-sensitive display 400 with a portion of a GUI 410 shown. The portion of the GUI 410 includes a group of elements A, B, C, D, E, F, G, H, and I in a relatively tight spatial arrangement. The portion of the GUI 410 interacts with a GUI layout manager 420. The GUI layout manager 420 can control and determine an arrangement of GUI elements, such as elements A, B, C, D, E, F, G, H, and I, as such elements are presented on the touch-sensitive display 400. The GUI layout manager 420 can also interact with an offset module 430 to provide information regarding arrangement of GUI elements that the offset module 430 can use to adjust an offset of a pointer 440 from a finger 450 of a user.

In the example depicted, the GUI layout manager 420 can send information to the offset module 430 that indicates that elements A, B, C, D, E, F, G, H, and I of the GUI are closely spaced together. Such information can be a simple flag that indicates close spacing as opposed to a more spatially distributed arrangement or can be more complex, for one example, a value determined as a function of variables such as number of GUI elements displayed, size of each element, and total display size, among others.

As shown, the GUI layout manager 420 indicated to the offset module that a closely spaced arrangement of elements has been presented on the touch-sensitive display 400. The offset module 430 can use this information, and optionally combine this information with one or more user-selectable behavior preferences, to determine an appropriate offset for the pointer 440 from the finger 450. The amount of the offset, shown as distance x, is relatively large to reduce the chance that the finger 450 obscures view of the elements A, B, C, D, E, F, G, H, and I. Among the set of user-selectable preferences possible to access when determining an offset amount are a range of offset amounts and specific placement options for the pointer 440 such as placement in front of, to the right of, or to the left of the finger 450. Of course, other user-selectable preferences can be used.

Figure 9:
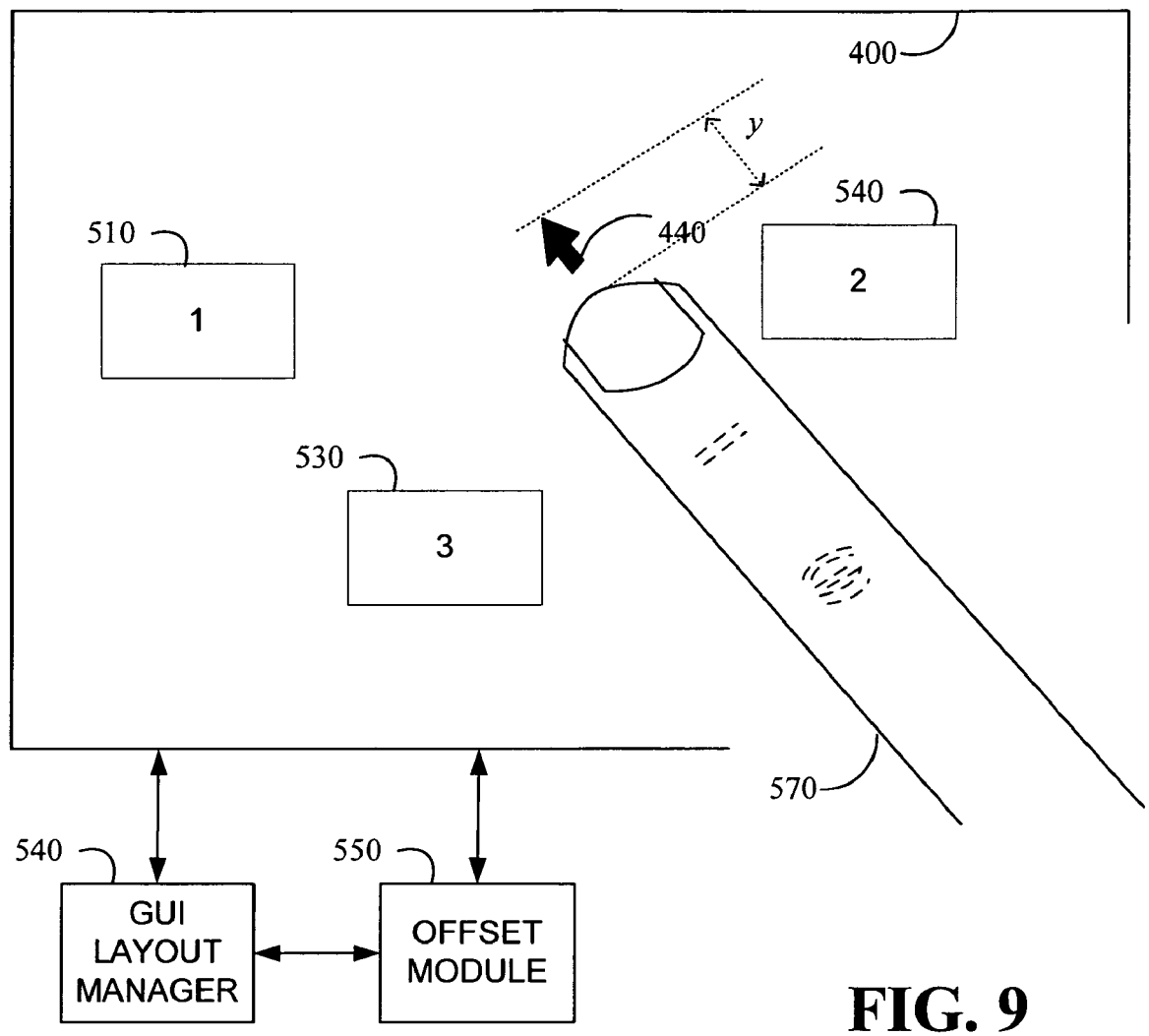
FIG. 9 is a diagram of a touch-sensitive display with elements of a GUI shown.

FIG. 9 is a system block diagram of a touch-sensitive display 500 with elements of a GUI 510, 520, 530 shown. The elements 510, 520, 530 of the GUI are displayed in a relatively distributed spatial arrangement. Positioning of the elements 510, 520, 530 can be controlled by a layout manager 540. The layout manager 540 can control and determine an arrangement of GUI elements, such as elements 510, 520, 530, as those elements are presented on the touch-sensitive display 500. The layout manager 540 can also interact with an offset module 550 to provide information regarding arrangement of GUI elements that the offset module 540 can use to adjust an offset of a pointer 560 from a finger 570 of a user.

In the example depicted, the layout manager 540 can send information to the offset module 550 that indicates that elements 510, 520, 530 of the GUI are spaced in a relatively distributed fashion. Such information can be a simple flag that indicates distributed spacing as opposed to a denser spatially distributed arrangement or can be more complex, for one example, a value determined as a function of variables such as number of GUI elements displayed, size of each element, and total display size, among others.

As shown, the GUI layout manager has indicated to the offset module that a distributed arrangement of elements has been presented on the touch-sensitive display 500. The offset module 550 can use this information, and optionally combine this information with one or more user-selectable behavior preferences, to determine an appropriate offset for the pointer 560 from the finger 570. The amount of the offset, shown as distance y, is relatively small, because of a lower potential with such a spatial arrangement for the finger 570 to obscure view of the elements 510, 520, 530. Among the set of user-selectable preferences possible to access when determining an offset amount are a range of offset amounts and specific placement options for the pointer 560 such as placement in front of, to the right of, or to the left of the finger 570. Of course, other user-selectable preferences can be used.

Figure 10:
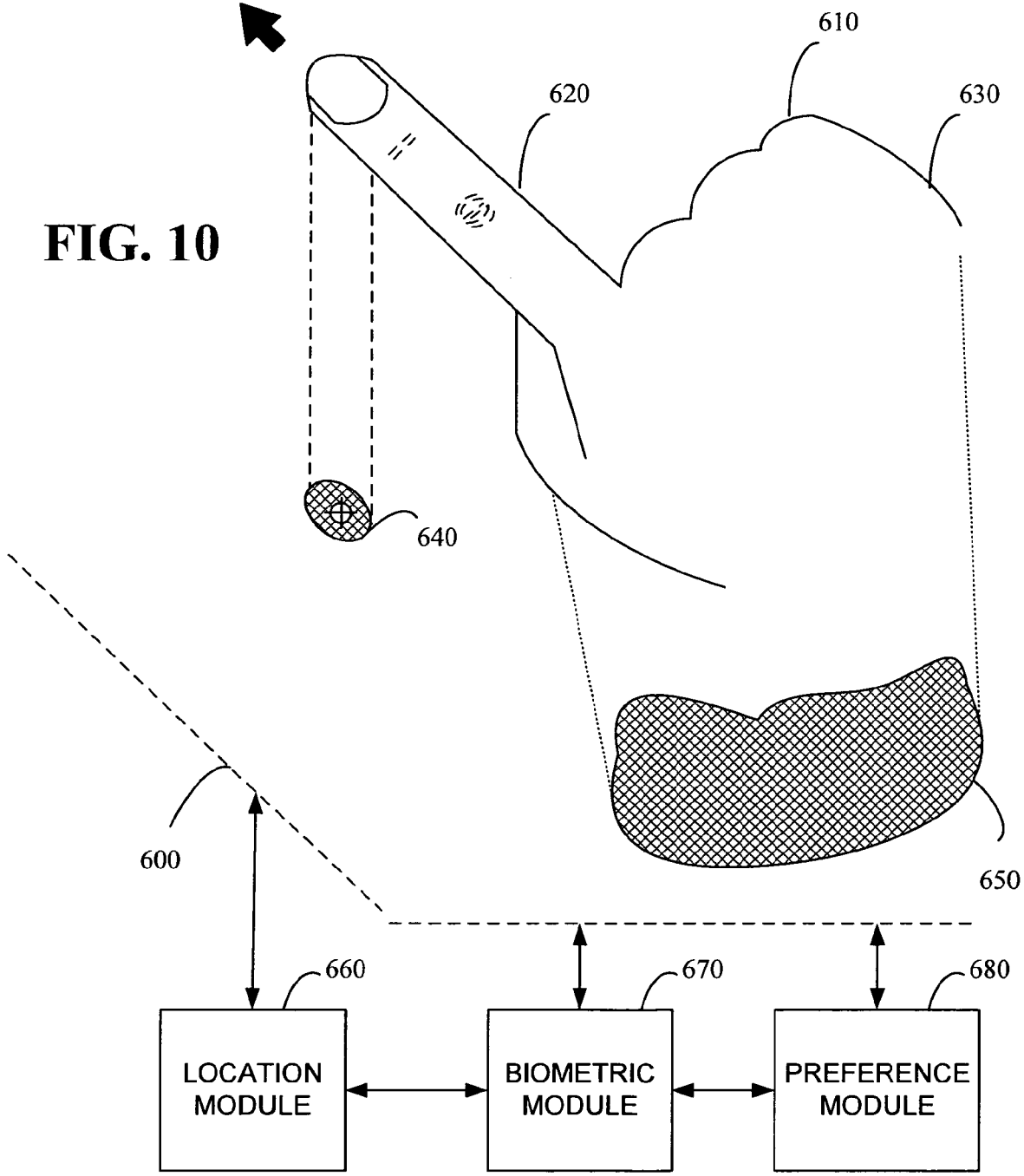
FIG. 10 is a diagram of a touch-sensitive display that uses biometric data.

FIG. 10 is a system block diagram of a touch-sensitive display 600 that uses biometric data. A hand 610 of a user includes a finger 620 and a heel 630. The hand 610 can contact a surface of the touch-sensitive display 600 to form regions of contact 640, 650. A location module 660 can detect that a touch has occurred and can determine further information about the touch, such as amount(s) of area(s) touched, shape(s), position(s), and orientation(s), among others. It should be appreciated that although in the example presented two discontinuous regions are shown, depending upon use and other factors a greater or fewer number of regions can be present.

The location module 660 can send information about the touch to a biometric module 670. The biometric module 670 can use information about the touch to identify a specific user. Once identified, the biometric module can send identification information to other components, such as a preferences module 680, to automatically apply individual user preferences to customize operation for the user.

Figure 11:
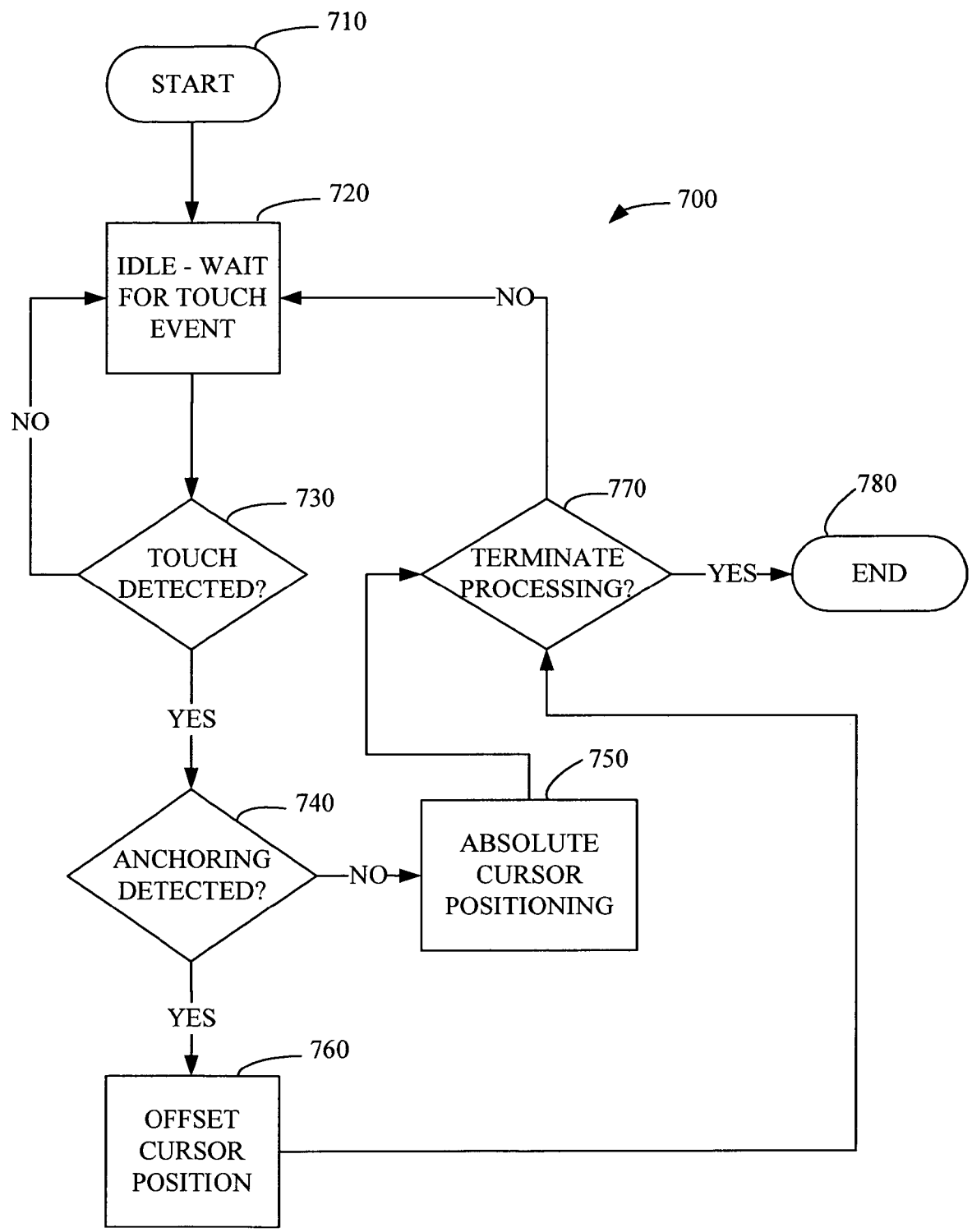
FIG. 11 is a flow diagram depicting steps in a method of operating a cursor or pointer positioning system in accordance with an additional aspect of the invention.
Figure 12:
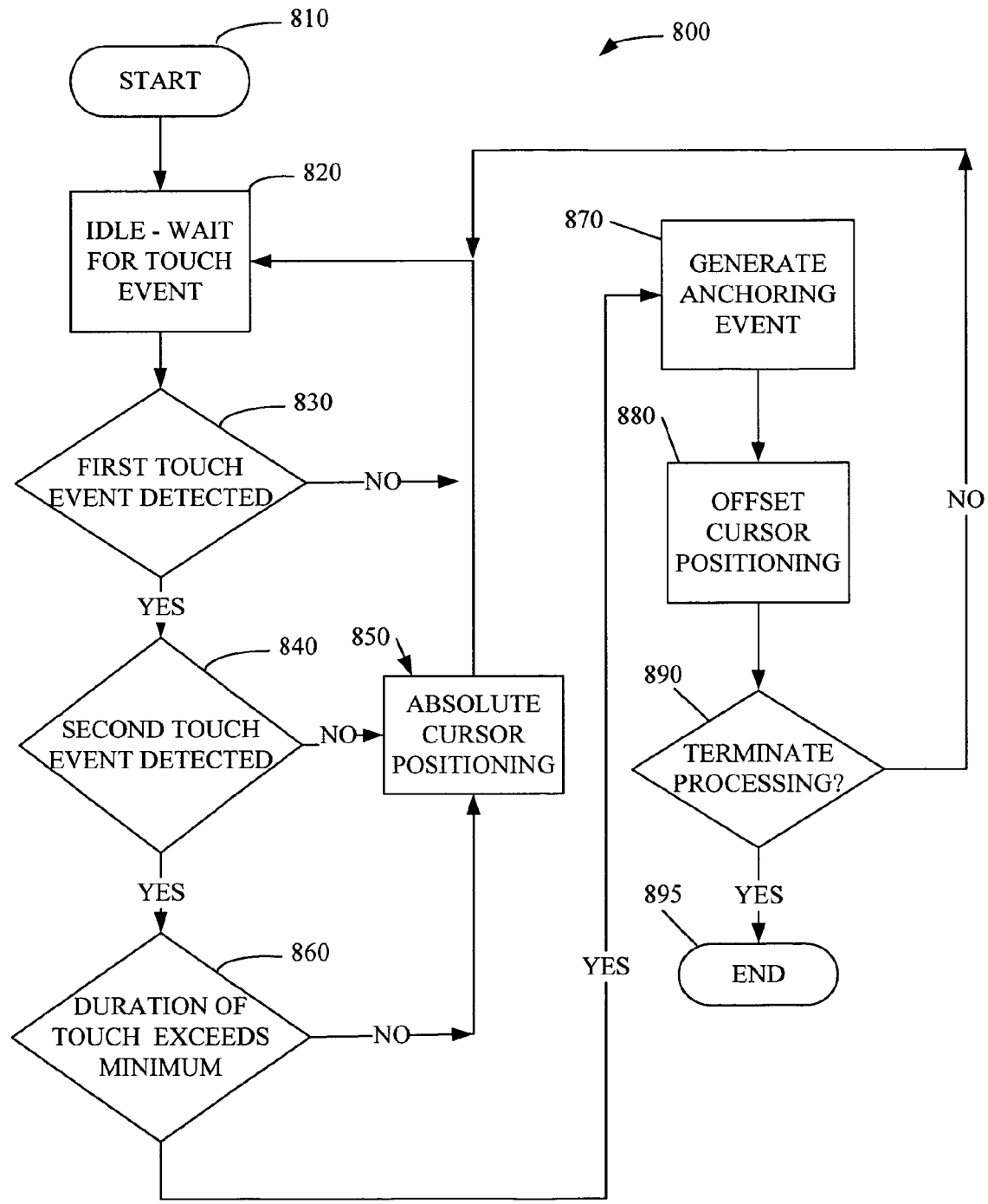
FIG. 12 is a flow diagram depicting steps in a method of operating a cursor or pointer positioning system in accordance with still another aspect of the invention.
Figure 13:
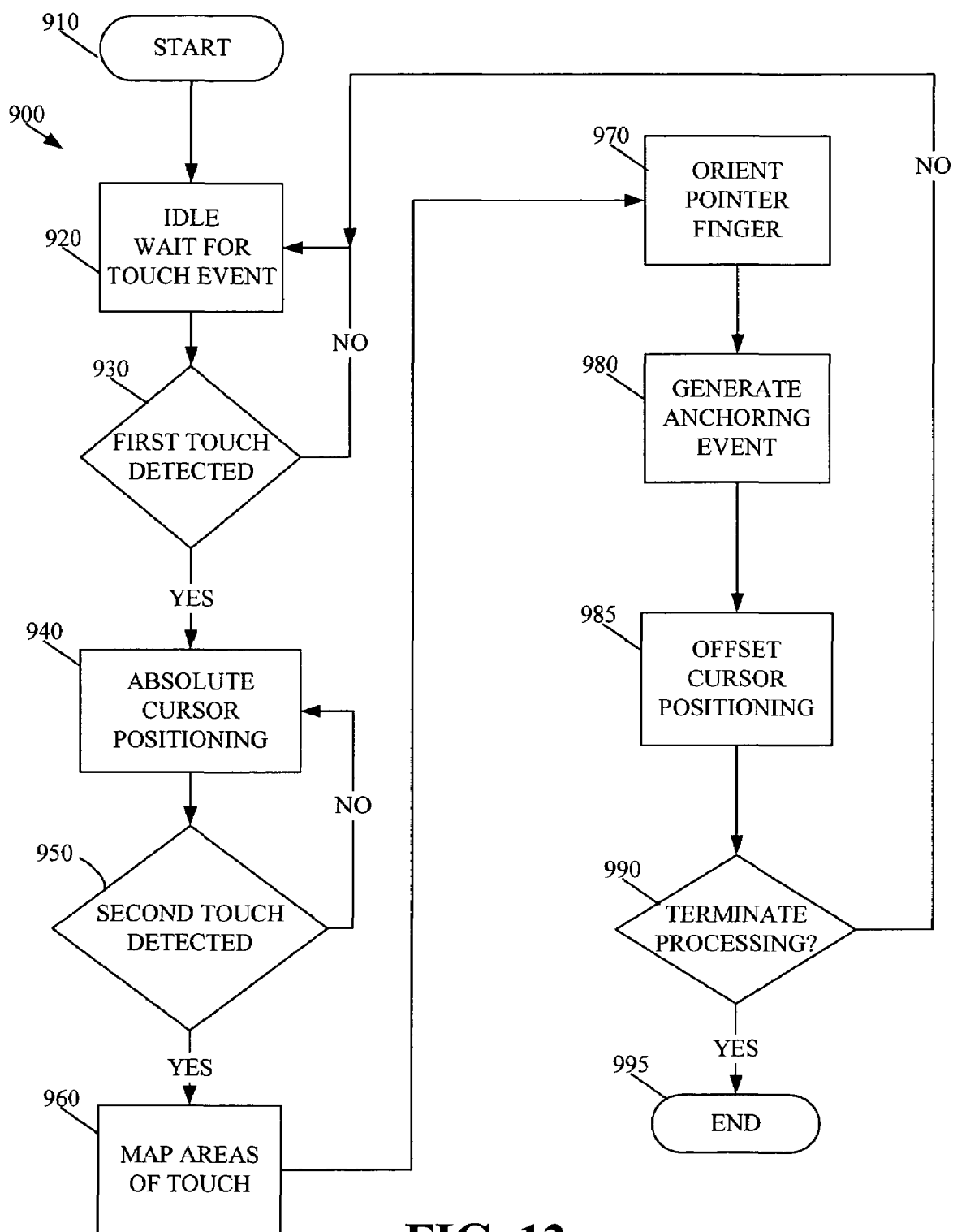
FIG. 13 is a flow diagram depicting steps in a method of operating a cursor or pointer positioning system in accordance with yet another aspect of the invention.

FIGS. 11-13 illustrate exemplary methodologies in accordance with the subject invention. For simplicity of explanation, these methodologies are depicted and described as a series of acts. Those of ordinary skill in the art will understand and appreciate that the subject invention is neither limited by the specific exemplary acts illustrated nor limited by the order of such acts. Skilled artisans will recognize that the described exemplary acts can occur in various orders and/or concurrently, and with other acts not presented and described herein. Furthermore, not all illustrated acts may be required to implement the methodologies in accordance with the subject invention. In addition, those skilled in the art will understand and appreciate that the described exemplary methodologies could alternatively be represented as a series of interrelated states via a state diagram or events.

FIG. 11 depicts a general methodology 700 for switching between modes of pointer behavior. The method begins at START block 710. Process block 720 indicates that the system is idle and waiting for a touch event to occur. Decision block 730 depicts a check (such as with an interrupt-driven system or a polling system) to determine whether a touch has been detected. If no touch is detected, the system returns to idle process 720. When a touch is detected, processing continues at decision block 740 to determine whether an anchoring event has occurred. If no anchoring event has been detected, processing occurs at process block 750 where the system performs absolute cursor positioning, for example, placing a pointer at a touched location on a touch screen. Alternatively, if an anchoring event is detected at decision block 760, processing occurs at process block 770 where the system performs offset cursor positioning, possibly by using one of the previously described techniques. Skilled artisans will readily recognize that the positions of process blocks 750 and 760 can be reversed such that the detection of anchoring at decision block 740 leads to absolute cursor positioning and a failure to detect anchoring leads to offset cursor positioning.

The processing path from either process block 750 or process block 760 continues at decision block 770 where a determination is made whether to terminate processing. If the determination is negative, processing continues back at process block 720 where the system remains idle until a touch is detected. If the determination is positive, processing concludes at END block 780.

FIG. 12 depicts a method 800 for switching between absolute cursor positioning and offset cursor positioning based upon whether an anchoring event has occurred. Processing of the method 800 begins at START block 810 and continues at process block 820 where the system remains idle until a first touch event is detected at decision block 830. If no touch is detected, processing returns to process block 820 where the system idles. If a first touch event is detected, processing continues at decision block 840 where a determination is made whether a second touch event has been detected. If not, processing continues at process block 850 where the system performs absolute cursor positioning. If a second touch is detected, processing continues at decision block 860 where a check is performed to see if a duration of the second detected touch event exceeds a minimum duration threshold to prevent further processing based upon accidental or incidental second detected touches. If the check fails, processing returns to process block 850 where the system performs absolute cursor positioning. If the check at decision block 860 is successful, processing continues at process block 870 where an anchoring event is generated.

Further processing occurs at process block 880 where the system performs offset cursor positioning. At decision block 890 a determination is made whether to terminate processing. If that determination is negative, processing returns to process block 820 where the system remains idle. If the determination made at decision block 890 is positive, processing terminates at END block 895.

FIG. 13 depicts another method 900 for switching between absolute cursor positioning and offset cursor positioning based upon whether an anchoring event has occurred. Processing of the method 900 begins at START block 910 and continues at process block 920 where the system remains idle until a first touch event is detected at decision block 930. If no touch is detected processing returns to process block 920 where the system idles. If a first touch event is detected, processing continues at process block 940 where the system performs absolute cursor positioning. Processing then continues at decision block 950 where a determination is made whether a second touch event has been detected. If not, processing continues at process block 940 where the system continues to operate using absolute cursor positioning.

If a second touch is detected, processing continues at process block 960 where a coordinate map representing areas of a touch screen that have been touched by a user is created. Processing then continues at process block 970 where an orientation of a finger of the hand of the user is derived, usually by employing one of the previously described methods. At process block 980, an anchoring event is created. At process block 985, the system engages in offset cursor positioning. Processing then continues at decision block 990 where a check is performed to see if processing should be terminated. If that check is negative, processing returns to process block 920 where the system remains idle. If the determination made at decision block 990 is positive, processing terminates at END block 995.

Figure 14:
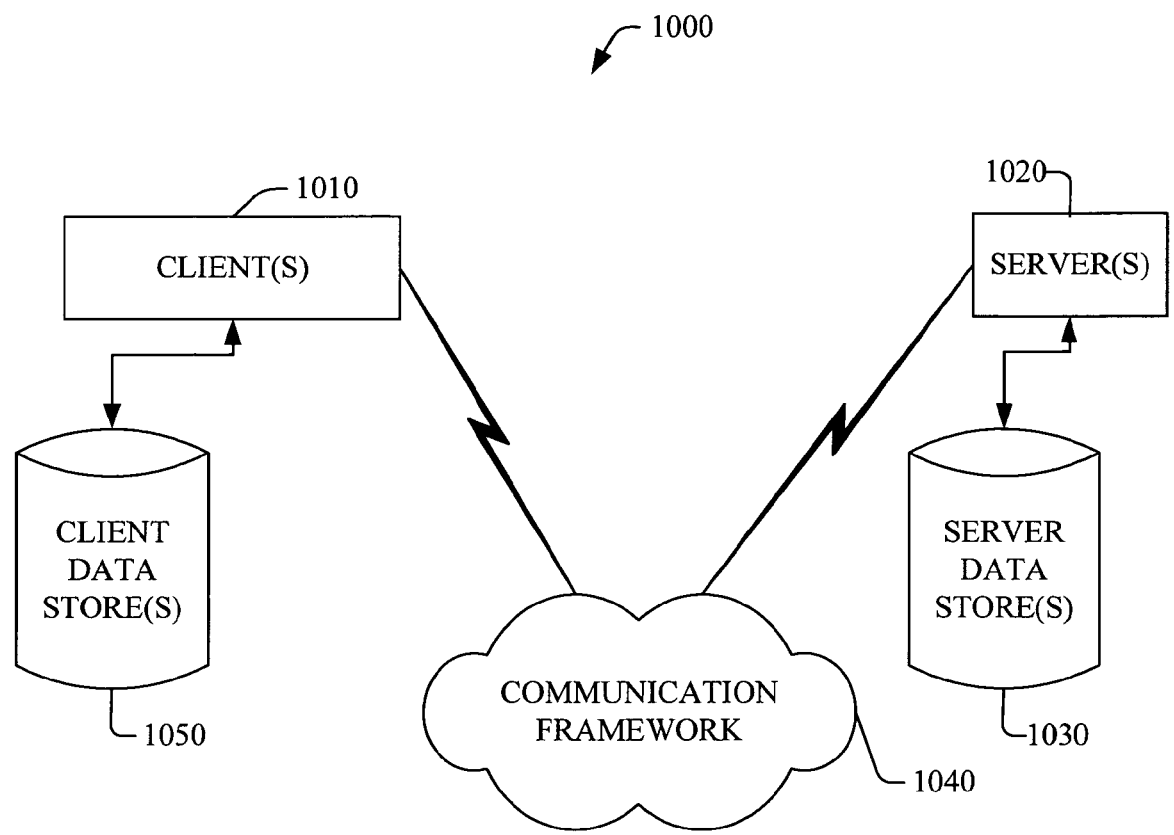
FIG. 14 illustrates an exemplary networking environment, wherein the novel aspects of the subject invention can be employed.
Figure 15:
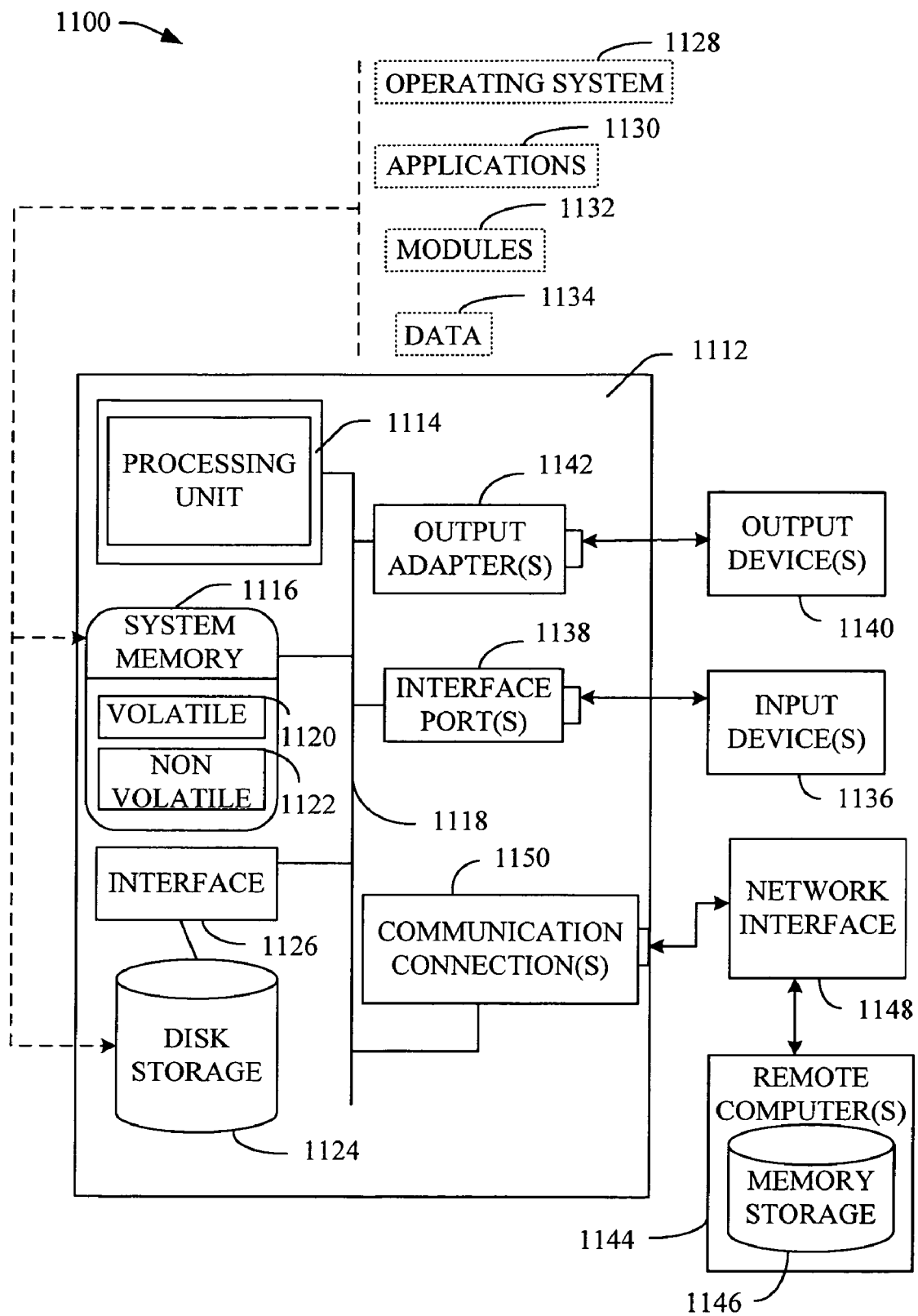
FIG. 15 illustrates an exemplary operating environment, wherein the novel aspects of the subject invention can be employed.

In order to provide additional context for implementing various aspects of the subject invention, FIGS. 14-15 and the following discussion is intended to provide a brief, general description of a suitable computing environment within which various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 14 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads or processes to perform transformations by employing the subject invention, for example.

One possible means of communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably associated with one or more client data store(s) 1050 that can be employed to store information local to the client(s) 1010. Similarly, the server(s) 1020 are operably associated with one or more server data store(s) 1030 that can be employed to store information local to the servers 1040.

With reference to FIG. 15, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. For example, FIG. 10 illustrates a disk storage 1124. The disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 10 describes software that acts as an intermediary between users and the basic computer resources described in the suitable operating environment 1100. Such software includes an operating system 1128. The operating system 1128, which can be stored on the disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. The input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically associated with computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for positioning an element on a visual display, comprising:
    a memory communicatively coupled to a processor, wherein the memory comprises computer-executable instructions for positioning the element on the visual display, wherein execution of the instructions by the processor results in operation of modules comprising:
    a touch detection module that detects a touch upon a touch-sensitive surface of a visual display;
    a position module that derives a position of the touch;
    an orientation module that derives an angular orientation of the touch; and
    an offset module that uses the position of the touch and the angular orientation of the touch to derive an offset for an element of a user interface, wherein the element is a pointer, wherein the offset positions the pointer in a location separated by both x-axis and y-axis values from the position of the detected touch sufficient to make the pointer fully visible a spaced distance from the finger; and
    an anchor detection module that detects anchoring a hand of a user, wherein detecting of anchoring of the hand of the user comprises detecting contact with the touch-sensitive visual display by a heel portion of the hand of the user, and wherein the anchoring is recognized as an indicator to switch between two modes, including:
        a relative cursor positioning mode, wherein the offset positions the pointer in the location separated by both x-axis and y-axis values from the position of the detected touch sufficient to make the pointer fully visible a spaced distance from the finger; and
        an absolute positioning mode, wherein a central location within the position of the detected touch is used as a pointer location.

2. The system of claim 1, wherein the anchor detection module derives a no-render zone within an area approximating a total screen area covered by the hand of the user to prevent elements of a GUI, including menus, from being obscured by the hand of the user.

3. The system of claim 2, wherein the anchor detection module detects an anchoring event based at least in part upon an approach selected from the group consisting of:
    a determination that two or more touched areas are discontinuous;
    a determination that a first touched area has changed its position relative to a second touched area; and
    a determination that a change in position of a first touched area relative to a second touched area is consistent with movement of a portion of a human hand upon a planar surface.

4. The system of claim 2, wherein the anchor detection module detects an anchoring event based at least in part upon at least one approach selected from the group consisting of:
    a reference to a coordinate map;
    a reference to information relating to human anatomical structures; and
    a reference to information relating to anatomical structures of a human hand.

5. The system of claim 2, wherein the anchor detection module detects an anchoring event based at least in part upon at least one approach selected from the group consisting of:
    a reference to a continuous function that represents a degree to which anchoring has occurred;
    a reference to a substantially continuous function that represents a degree to which anchoring has occurred;
    a reference to a discontinuous function that represents a degree to which anchoring has occurred; and
    a reference to a discrete function that represents a degree to which anchoring has occurred.

6. The system of claim 1, wherein the orientation module calculates an orientation based at least in part upon an approach selected from the group consisting of:
    a shape of a touched area;
    a reference to information relating to human anatomical structures; and a reference to information relating to anatomical structures of a human hand.

7. The system of claim 1, further comprising a module that designates to the offset module at least one area of the user interface where no new information is rendered, the offset module is additionally configured to consider the at least one area to derive the offset for the element of the user interface.

8. A method for positioning an element of a graphical user interface on a visual display, comprising:
   storing, in a memory communicatively coupled to a processor, computer-executable instructions for performing the method of positioning the element of the graphical user interface on the visual display;
   executing the instructions on the processor;
   according to the instructions being executed:
   detecting a touch of a finger of a user on at least a portion of a touch-sensitive visual display;
   calculating a position of the detected touch;
   deriving an angular orientation of the detected touch;
   calculating an offset for an element to be positioned on a visual display from the calculated position and the angular orientation, wherein the element is a pointer, wherein the offset positions the pointer in a location separated by both x-axis and y-axis values from the position of the detected touch sufficient to make the pointer fully visible a spaced distance from the finger;
   determining a degree to which the user has anchored a hand by using a reference function, wherein anchoring the hand comprises contacting the touch-sensitive visual display with a heel portion of the hand of the user, and wherein the anchoring is recognized as an indicator to switch between two modes, including:
      a relative cursor positioning mode, wherein the offset positions the pointer in the location separated by both x-axis and v-axis values from the position of the detected touch sufficient to make the pointer fully visible a spaced distance from the finger; and
      an absolute positioning mode, wherein a central location within the position of the detected touch is used;
   determining a correlation between a shape of an area affected by the detected touch and a shape of a structure of a human hand; and
   calculating whether an amount of time elapsed between detection of the detected touch and detection of anchoring the hand of the user is within a predetermined range.

9. The method of claim 8, wherein the reference function comprises:
   detecting a second touch on at least a portion of a touch-sensitive visual display;
   calculating a first area affected by the detected touch;
   calculating a second area affected by the second touch; and
   determining that the first and second areas are substantially separate.

10. The method of claim 8, wherein deriving the angular orientation of the detected touch comprises at least one of:
   calculating an axis through the shape of the area affected by the touch; and
   comparing a map of the area of the detected touch with properties of anatomical structures of a human hand.

11. A system to position an element on a visual display, comprising:
   storing means, for storing in a memory communicatively coupled to a processor, computer-executable instructions for positioning the element on the visual display;
   executing means for executing the instructions on the processor;
   means for detecting a primary touch from a user on at least a portion of a touch-sensitive visual display;
   means for calculating a position of the primary touch;
   means for detecting a supplemental touch by the user on at least a portion of the touch-sensitive visual display, calculating a primary area affected by the primary touch, calculating a supplemental area affected by a supplemental touch, and determining that the primary area and the supplemental area are substantially separate;
   means for creating a coordinate map representing a touched region, the touched region includes an area impacted by the primary touch, an area impacted by at least one supplemental touch, or an area impacted by at least two touches;
   means for deriving an angular orientation of the primary touch based upon the created coordinate map; and
   means for calculating an offset for an element to be positioned on a visual display based upon the calculated position and derived angular orientation; and
   means for determining the user has anchored a hand that made at least the primary touch or the supplemental touch by using a reference function, wherein anchoring the hand comprises contacting the touch-sensitive visual display with a heel portion of the hand of the user, and wherein the anchoring is recognized as an indicator to switch between two modes, including:
      a relative cursor positioning mode, wherein the offset positions the pointer in the location separated by both x-axis and y-axis values from the position of the detected touch sufficient to make the pointer fully visible a spaced distance from the finger; and
      an absolute positioning mode, wherein a central location within the position of the detected touch is used.

12. The system of claim 11, further comprising:
   means for determining a degree to which the user has anchored a hand that made at least the primary touch or the supplemental touch by using reference function;
   means for determining a correlation between a shape of the touched region and a shape of a structure of a human hand; and
   means for inferring if an anchoring event is intended based upon if the correlation is within a specified amount.

13. The system of claim 11, further comprising:
   means for determining an identity of the user that makes the primary touch or supplemental touch; and
   means for applying at least one user preference based upon the determined identity.

14. The system of claim 11, further comprising:
   means for calculating whether an amount of time elapsed between the detection of the primary touch and a detection of the supplemental touch is within a predetermined range; and
   means for inferring if an anchoring event is intended based upon if the elapsed time is within the predetermined range.

* * * * *